(No Model.)
W. C. WOLFF & J. C. MANNING.
BELT FASTENER.
No. 300,825. Patented June 24, 1884.
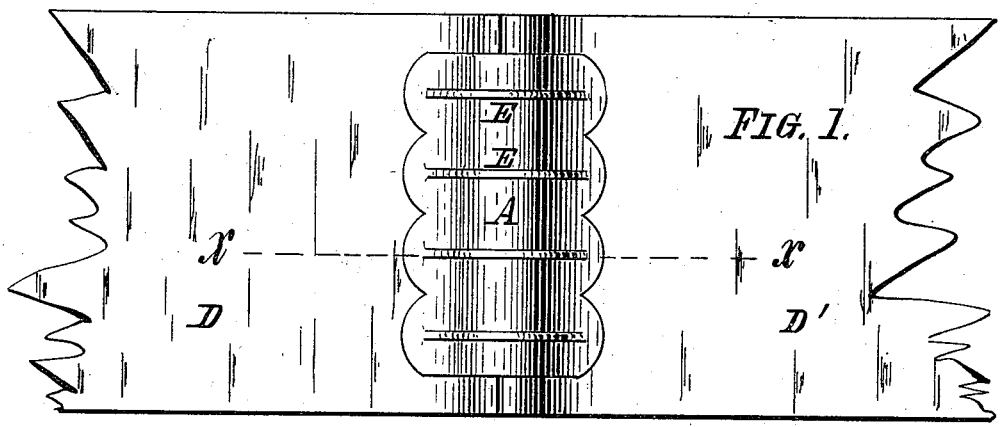
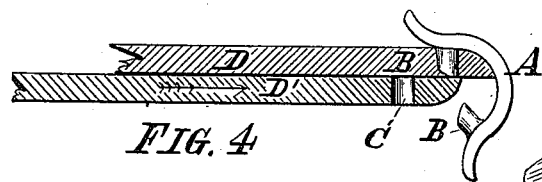
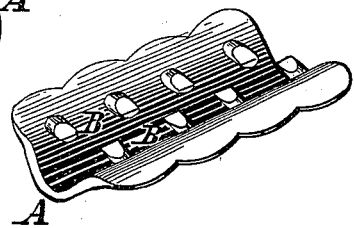
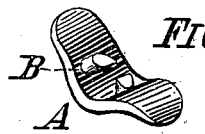
Witnesses:
Willie O. Stark
A. Stark
Inventors:
Wm. C. Wolff
John C. Manning
by Michael J. Stark,
Attorney.

UNITED STATES PATENT OFFICE.

WILLIAM C. WOLFF AND JOHN C. MANNING, OF BUFFALO, NEW YORK.

BELT-FASTENER.

SPECIFICATION forming part of Letters Patent No. 300,825, dated June 24, 1884.

Application filed April 5, 1884. (No model.)

*To all whom it may concern:*

Be it known that we, WILLIAM C. WOLFF and JOHN C. MANNING, both of Buffalo, Erie county, New York, have jointly invented certain new and useful Improvements on Belt-Fastenings; and we do hereby declare that the following description of our said invention, taken in connection with the accompanying sheet of drawings, forms a full, clear, and exact specification, which will enable others skilled in the art to which it appertains to make and use the same.

Our present invention has general reference to an improved belt-fastener; and it consists, essentially, in the novel and peculiar combination of parts and details of construction, as hereinafter first fully set forth and described, and then pointed out in the claim.

In the drawings already mentioned, which serve to illustrate our said invention more fully, Figure 1 is a plan of a portion of a belting, the ends of which are secured together by means of our improved belt-fastener. Fig. 2 is a transverse sectional elevation in line $x\,x$ of Fig. 1. Fig. 3 is a perspective view of the fastener detached. Fig. 4 is a transverse sectional elevation illustrating the manner of applying our said belt-fastener. Fig. 5 is a perspective view of a portion of belting and fastener. Fig. 6 is a similar view of the fastening consisting of a single pair of prongs and plate.

Like parts are designated by corresponding letters of reference in all the figures.

The object of our present invention is the production of a simple device for connecting the ends of leather, rubber, linen, and other flexible belts and bands in such a manner that the fastening may be readily removed whenever desired, without the slightest preparation, and replaced in a moment's time.

Heretofore many devices have been produced for connecting the ends of flexible belts and bands, none of which, however, accomplishes the object in such a complete manner as to leave nothing to be desired, the drawbacks being generally that the fastening, when once applied, cannot be removed without either destroying it for further use or destroying that portion of the belt to which the fastening is applied.

To overcome all the objections to especially metallic belt-fasteners, we construct our fastening of a plate, A, of any suitable metal, such plate being curved substantially into V shape, the angle of which is curved, as clearly illustrated in the figures. This plate we make of a width varying from, say, three-fourths of an inch to three inches, more or less, and provide it in its concave side with a number of projections or prongs, B, pointing in opposite directions, the axis of such points being nearly in a straight line, or but slightly inclined. These prongs are of a length corresponding with the thickness of the belt to which it is designed for application, they being longer for two and three ply belts than for such of a single thickness only. Their number also varies with the width of the plates A from one to six or more pairs, a plate with a single pair of prongs, B, being shown in Fig. 6, and one with four pairs in Fig. 3.

The plates or fasteners are applied to the ends of the belting in the following manner, to wit: A proper number of holes, C, are first punched along the edge of the belt corresponding with the number of prongs on the plate A. Then one end of the belt D is pushed onto its corresponding set of prongs, after which the opposite end, D', of the belt is laid flat upon the first-mentioned end, as shown in Fig. 4, and then pushed in position upon the respective prongs B when the belt is straightened out, and thereby prevented from disengaging from the fastening, or vice versa. It will now be readily observed that while in a running condition and position the removal of the fastening or the disengaging of the belt therefrom is an impossibility, yet nothing remains to be done to disengage the parts but to bring them into the position in which the fastening can be and has been applied. It is therefore evident that this belt-fastening can be removed from and reapplied to the belt any number of times without destruction to it or the belt, and that, furthermore, this operation can be performed in less time than any other fastening with which we are acquainted. The fastening is preferably produced entire in the process of casting in malleable iron, although it may be manufactured from sheet metal by means of suitable cutting, perforating, and shaping dies, and the prongs inserted and fastened in any desirable manner, and we do not, therefore, confine ourselves to any particular method of manufacture. So may the plate be made with strengthening-ribs E, Figs. 1 and 2, if desired, without departing from our invention.

The prongs B are usually circular in cross-section; but they may be oblong, if so desired. The former shape, however, is preferred for various obvious reasons.

Having thus fully described our invention, we claim as new and desire to secure to us by Letters Patent of the United States—

As an improved article of manufacture, a belt-fastening device consisting of the U-shaped plate A, having inclined pointed pins B in the body thereof above the ends of the plate, adapted to receive the belting D D' by means of perforations C in the ends of said belting, as shown and described.

In testimony that we claim the foregoing as our invention we have hereto set our hands in the presence of two subscribing witnesses.

WM. C. WOLFF.
JOHN C. MANNING.

Attest:
MICHAEL J. STARK,
JOHN C. DUERR.